UNITED STATES PATENT OFFICE.

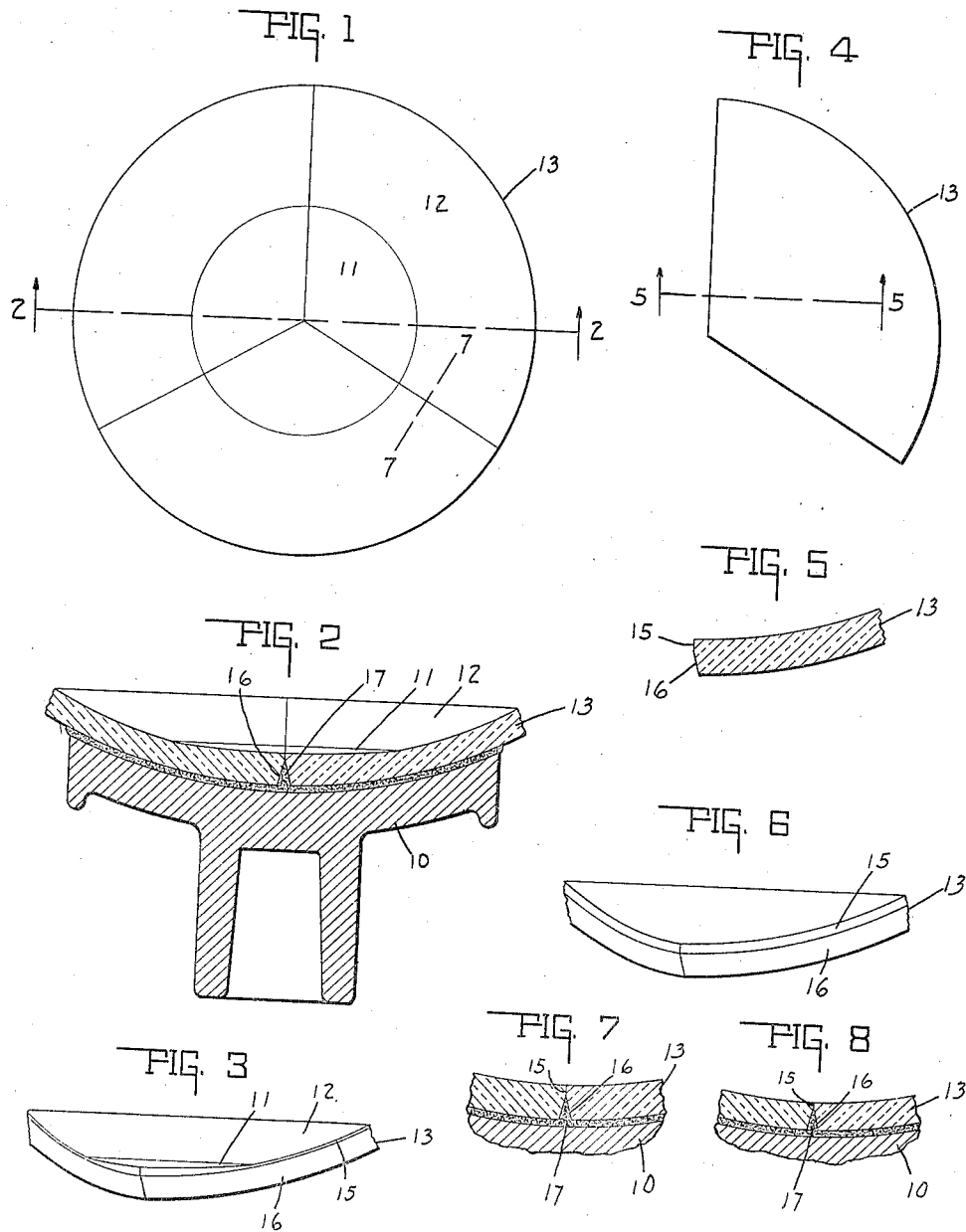

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

PROCESS OF MAKING BIFOCAL LENSES.

1,410,367.   Specification of Letters Patent.   Patented Mar. 21, 1922.

Application filed November 1, 1920. Serial No. 421,007.

*To all whom it may concern:*

Be it known that I, LUCIAN W. BUGBEE, a citizen of the United States, and a resident of Indianapolis, county of Marion, and State of Indiana, have invented a certain new and useful Process of Making Bifocal Lenses; and I do hereby declare that the following is a full, clear, and exact description thereof, reference being had to the accompanying drawings, in which like numerals refer to like parts.

The object of this invention is to improve the process of manufacturing opthalmic lenses and particularly bifocal lenses ground and made of one piece of glass, wherein a novel bifocal lens or blank of the sort is produced and the cost of manufacture reduced.

While the invention is not necessarily limited to the simultaneous grinding and polishing of any particular number of bifocal blanks secured on one lens holder, yet it is especially well adapted for use in thus treating simultaneously on one lens holder three pieces of glass of uniform size and shape, which when fitted together as hereinafter explained and secured on the lens holder, form a disk-shaped whole which can receive satisfactory treatment from the tools employed in the art of grinding and polishing such lens or lens blanks.

In such manufacture where a plurality of pieces of glass are fitted together upon one lens holder for simultaneous treatment by one lap or tool, it is very important and usually vital that none of the emery which is employed in the grinding part of the process of making such lens blanks shall remain between the pieces of glass or blanks secured together on the same lens holder, because if any emery does remain, it will be picked up by the polishing apparatus while revolving and will scratch the surface of the lens and ruin it. This makes it necessary that no emery be left where the polishing pad or means will pick it up and rub it over the surface of the lens while polishing the same.

Therefore, the primary object of this invention is to so form the pieces of glass that are fitted together into disk-like position on the lens holder so they shall fit with a tight close joint along the surface thereof to be ground and polished when secured on the lens holder, so that when the grinding is completed, there will be at the ground surface no crack or space between the pieces of glass secured on the lens holder for receiving and holding emery.

The full nature of the invention will be understood from the accompanying drawings and the following description and claims.

In the drawings herein, Fig. 1 is a plan view of a plurality of bifocal lens blanks as they are secured upon the lens holder with their adjacent edges fitted tightly together and at the end of the grinding process. Fig. 2 is a cross section through the lens blanks and the lens holder on the line 2—2 of Fig. 1. Fig. 3 is a perspective view of one of the lens blanks after it is removed from the lens holder. Fig. 4 is a plan view of the piece of glass used for making one lens blank prior to any grinding thereof. Fig. 5 is a section on the line 5—5 of Fig. 4. Fig. 6 is a perspective view of one blank previous to the grinding. Fig. 7 is a section on the line 7—7 of Fig. 1 prior to the grinding. Fig. 8 is the same after the grinding.

There is shown herein a lens holder 10 of any ordinary type used in grinding and polishing opthalmic lenses. In manufacturing onepiece bifocal lenses, the usual method is to rotate the lens holder 10 and upon it secure the glass to be treated in a disk or saucer shape form, as shown in Figs. 1 and 2, whereby there may be ground upon the lens blanks secured thereon central or reading portions 11 and a surrounding series of distance portions 12 of different dioptrics. The glass secured upon said holder for treatment may be made of one single piece, as is common in the art, or of a plurality of pieces, each of which plurality of pieces when treated forms a lens blank from which a single lens may be cut. The number of pieces of glass which may be thus secured upon the lens holder for such simultaneous treatment may be two or three or more, but herein three lens blanks 13 are shown secured upon the lens holder 10. Said pieces of glass are formed, mounted and treated according to the following process.

In the first instance the glass for one lens blank is formed by molding the same so as to have the shape in plan view, shown in Fig. 4, that is, a sector of a circle including 120 degrees. It is molded so that the upper and lower surfaces will be substantially parallel with each other and will have approximately the base curvature of the lens which is afterwards to be ground and polished. This is illustrated in Figs. 5 and 7. The outer edge of the piece of glass is molded so as to be curved and concentric with the opposite corner of the piece which is formed at the meeting of the two radial side edges of the glass, as shown in Fig. 4. The radial side edges of the glass are each made straight so that when three such pieces of glass are mounted on the lens holder, they will interfit as shown in Fig. 1 and make a disk-like body of glass to be treated by the laps or tools.

The radial side edges of each piece of glass are formed substantially as shown at the left hand edge of Fig. 5, that is, with an upper vertical straight edge 15 and an inclined lower edge or surface 16. The straight edge is adjacent the surface to be ground and polished and should be at least two millimeters wide and extend from the central corner of the blank to the periphery thereof. The lower surface 16 of the radial side edge of the glass should extend from the straight edge 15 down to the lower side of the glass. This gives to the radial side edges of the glass the appearance shown in Fig. 5.

The three pieces of glass formed as above described are fitted together on the lens holder, as shown in Fig. 1, and secured thereto by pitch or other adhesive material 17 in the well known manner. The pitch or pieces of glass are applied, however, so that the space A-shaped in cross section between two adjacent pieces of glass, as shown in Figs. 2 and 7, will be filled with the pitch or adhesive material; but there will be no pitch or adhesive material on the straight edge surface 15 of the pieces of glass. This makes the pieces of glass fit together very tightly so that there will be a close joint and no space for emery to lodge.

After the pieces of glass have been secured on the lens holder as explained, they are ground by any laps or tools such as are used in the art so as to form the concentric surfaces shown in Figs. 1 and 2. Since the blanks shown herein are to make concave lenses, the curvature of the central surface must be less than that of the surrounding distance surfaces, and, therefore, as shown in Fig. 2, the central portion of the glass will be ground less than the other portion of the glass. But when the blanks are ground, they will be substantially as shown in Figs. 2 and 3.

The straight edge surface 15 will be partially ground away, more at the distance surface than at the reading surface. But the straight edge portion 15 should always be wide enough vertically so that when the grinding operation is finished, there will still be a straight edge left, as shown in the center of Fig. 2 and as shown in Fig. 8. In other words, the glass should not be ground down to the pitch or adhesive material, for that would make cracks or grooves between the pieces of glass in which emery might lodge. The difference between the thickness of glass at the line 7—7 of Fig. 1 before and after grinding is shown in Figs 7 and 8. After the blanks have been ground as explained and as illustrated in Fig. 2, the bifocal surfaces thereof are polished. The quality and degree of perfection of the resultant lenses depends very much upon the polishing, and it is important that no emery be allowed to get on the polishing pad or tool, for that would scratch instead of polish the surfaces and would ruin the lenses. After the lens blanks have been polished, they are removed from the lens holder and a finished lens cut from each blank in a manner well known in the art.

The blanks before the grinding process are, as above explained, molded into the desired shape so that they can fit tightly together. If, however, in the molding of the particular pieces of glass, the straight edge surfaces 15 are not perfectly straight and true, they are ground straight and true by applying the same to a straight edge grinder or grinding stone, whereby the desired close joint between the blanks is obtained when they are mounted on the lens holder.

The word "lens" used herein refers to a glass article for ophthalmic purposes finished on both sides so as to serve as a lens. When said articles are finished only on one side they are referred to as "lens blanks." The pieces of glass before a finished surface is ground thereon are called herein "glass blanks" or "pieces of glass," although in the art they are sometimes also called "lens blanks."

The invention claimed is:

1. In the process of making lenses, forming similar glass blanks sector-shaped with radial straight side edge surfaces, the portions thereof adjacent the surface to have the surfaces ground thereon extending at a right angle thereto beyond the portion of the blanks to be ground away in forming said surfaces, mounting a plurality of said sector-shaped blanks on a lens holder adjacent each other in a circular series with said straight side edge surfaces fitting tightly together to form closed joints between the blanks, and grinding the surfaces on said blanks, whereby said closed joints between the blanks will be maintained during the grinding of the surfaces.

2. In the process of making lenses forming similar blanks sector-shaped with straight edge surfaces adjacent and extending at right angles to the surfaces to be ground and polished and beyond the portion of the blanks to be ground away, bevelling the remaining portions of the edge surfaces of said blanks so as to recede, mounting a plurality of said sector-shaped blanks on a lens holder adjacent each other in a circular series with said straight side edge surfaces fitting tightly together to form closed joints between the blanks near the surfaces to be ground and leaving an A-shaped space between adjacent blanks next to the holder, and grinding the surfaces on said blanks, whereby said closed joints between the blanks will be maintained during the grinding of the surfaces, substantially as set forth.

In witness whereof, I have hereunto affixed my signature.

LUCIAN W. BUGBEE.